Oct. 7, 1930.                O. N. BRYANT                1,778,004
                    BLEEDER TURBINE CONTROL MECHANISM
                    Filed April 11, 1925      3 Sheets-Sheet 1

WITNESS:

O. N. BRYANT
INVENTOR

BY

ATTORNEY

Oct. 7, 1930. O. N. BRYANT 1,778,004
BLEEDER TURBINE CONTROL MECHANISM
Filed April 11, 1925 3 Sheets-Sheet 2

WITNESS:

O. N. Bryant
INVENTOR

BY
ATTORNEY

Oct. 7, 1930.  O. N. BRYANT  1,778,004
BLEEDER TURBINE CONTROL MECHANISM
Filed April 11, 1925  3 Sheets-Sheet 3

WITNESS:

O. N. BRYANT
INVENTOR

BY
ATTORNEY

Patented Oct. 7, 1930

1,778,004

UNITED STATES PATENT OFFICE

OZRO N. BRYANT, OF MOORES, PENNSYLVANIA, ASSIGNOR TO WESTINGHOUSE ELECTRIC & MANUFACTURING COMPANY, A CORPORATION OF PENNSYLVANIA

BLEEDER-TURBINE CONTROL MECHANISM

Application filed April 11, 1925. Serial No. 22,427.

My invention relates to regulating apparatus for elastic fluid turbines, more particularly for turbines of the extraction or bleeder type, and has for its object to provide apparatus of the character designated which shall effectively control the turbine whether elastic fluid is being extracted from the turbine for process, or other purposes, or is being admitted to the turbine at the bleeder connection for the purpose of developing power.

A further object of my invention is to provide a regulating apparatus for a bleeder turbine which shall effectively regulate the speed of the turbine over wide ranges of bleeder demand.

A still further object of my invention is to provide regulating apparatus for a bleeder turbine having an interstage valve and working in parallel with other prime movers, wherein the interstage valve is so regulated when elastic fluid is being admitted to the turbine at the bleeder connection for the purpose of developing power that the bleeder turbine shall tend to take over more than its share of the load.

Another object of my invention is to provide a regulating apparatus for an engine, which is responsive to a plurality of varying conditions in accordance with which it is desired to regulate the engine.

A further object is to provide new and improved regulating or control mechanism, more particularly for a prime mover.

Figure 1:
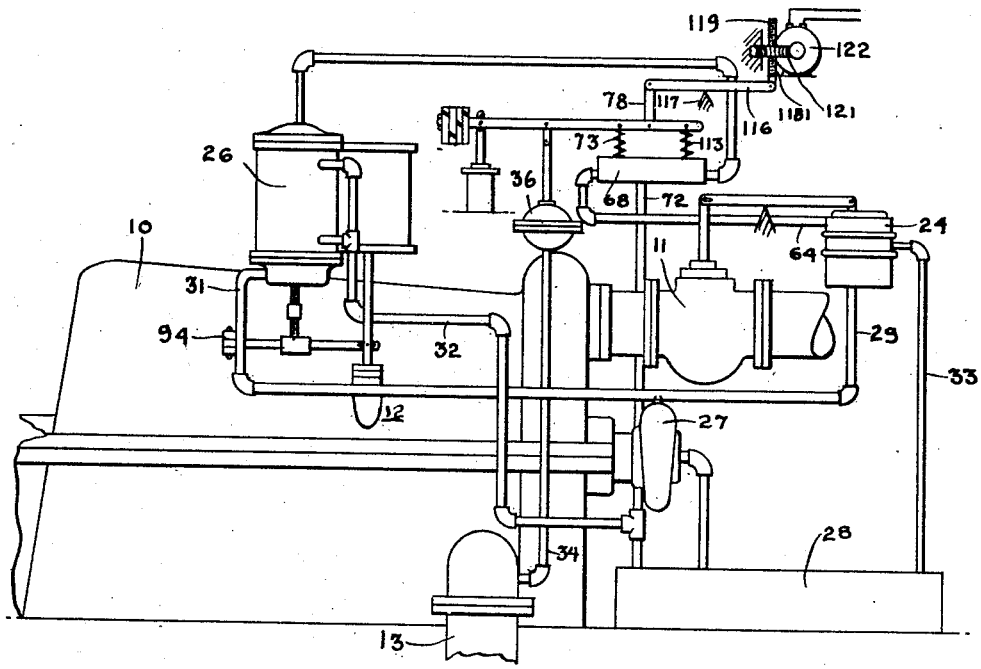
Figure 2:
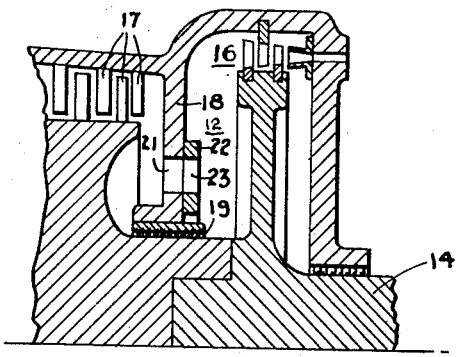
Figure 3:
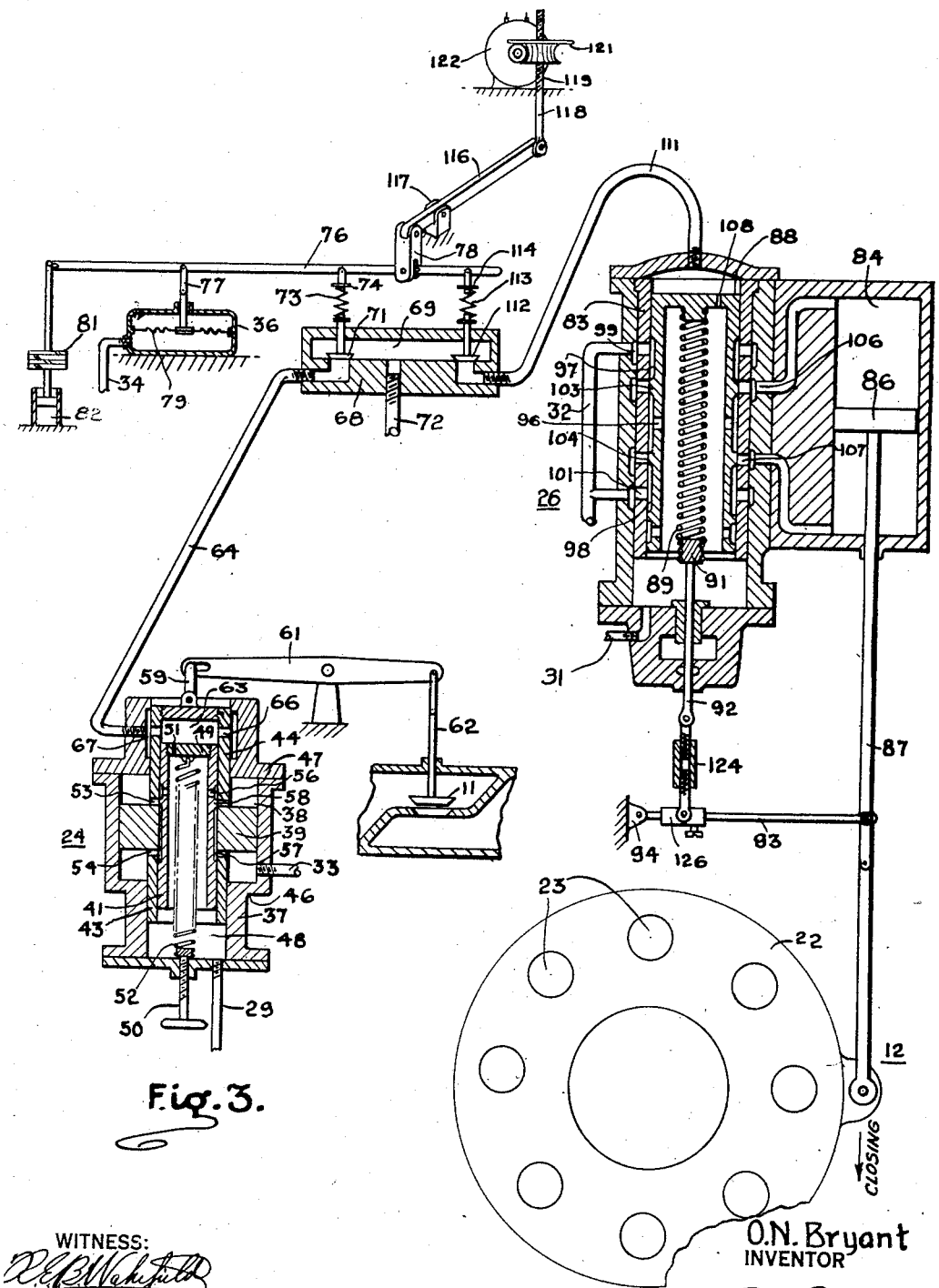
Figure 4:
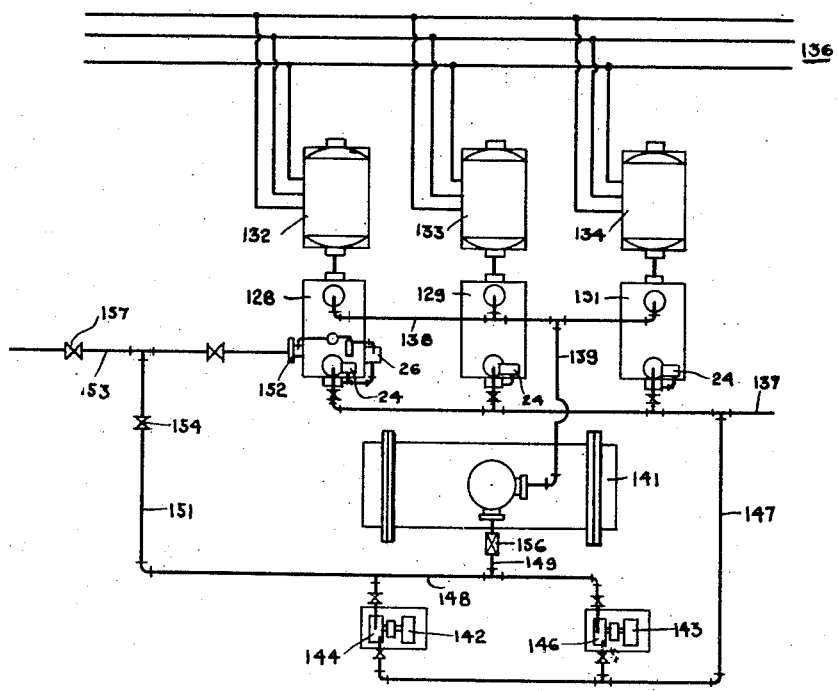

These and other objects are obtained by apparatus made in accordance with my invention and illustrated in the accompanying drawings in which:

Fig. 1 is a view showing, in elevation, a bleeder turbine having my improved regulating apparatus applied thereto; Fig. 2 is a fragmentary longitudinal sectional view of the turbine and showing the interstage valve employed therein; Fig. 3 is a diagrammatic view of the regulating apparatus, explanatory of its operation, and showing in section the principal elements thereof; and Fig. 4 is a diagrammatic view showing a power house arrangement wherein a bleeder turbine equipped with my improved regulating apparatus is working in parallel with other turbines and may be employed either as an extraction turbine or as a mixed pressure turbine.

Various schemes have heretofore been proposed for the regulation of bleeder turbines, the conventional form embodying a speed governor for controlling the turbine admission valve, a pressure-responsive device for controlling a valve associated with the bleeder line and some sort of mechanical connection between the speed governor and the pressure-responsive device whereby the operation of one is modified by the other. While such apparatus has given more or less satisfactory results, it has been cumbersome of design and has necessitated the employment of complicated linkages that has impaired its efficient operation and has left much to be desired in the way of close regulation of the turbine.

In accordance with my invention I employ variable fluid pressure operated devices for controlling both the admission valve and the bleeder connection valve and develop fluid pressure varying as a function of the speed of the turbine for operating the control devices. The action of both of the control devices is further modified by variable back pressures, said back pressures being varied by a device responsive to changes in bleeder line pressure.

My invention further consists in the control devices per se, and to the manner of obtaining the variable back pressure, which consists in providing a restricted flow of fluid under pressure into an enclosed space and controlling the pressure of the fluid therein by a pressure relief valve which is controlled in response to an operating condition of the turbine or other prime mover to which the control mechanism is applied.

Referring now to the drawings for a better understanding of my invention I show in Fig. 1 at 10 a turbine having an admission valve 11, an interstage valve at 12, and a bleeder connection at 13, all as is well understood in the art to which my invention relates. Elastic fluid, hereinafter referred to as steam, is normally admitted to the turbine through the admission valve 11 and is first expanded through a high pressure stage. After expansion in the high pressure stage part of the steam may pass from the turbine through the bleeder connection 13, the remainder being expanded through later stages of the turbine. The amount of steam passing through the bleeder connection and through the low pressure stages is controlled by the interstage valve at 12 which may be of any suitable form, a very satisfactory form being illustrated in Fig. 2. I here show a turbine rotor 14 having a stage of impulse blading at 16 and a plurality of stages of reaction blading at 17. Between the impulse stage 16 and the reaction stages 17 is a dividing wall member 18. Suitable packing elements 19 are carried by the wall member 18 for preventing the passage of steam along the rotor from the impulse or high pressure section 16 to the reaction or low pressure sections 17. The wall member 18 is supplied with a suitable number of ports 21 controlled by a grid valve member 22, better illustrated in Fig. 3.

The grid valve member 22 is arranged to be rotated as indicated in Fig. 1 and as shown in Fig. 3. The grid valve member 22 is provided with a series of ports 23—23 cooperating with the ports 21 in the dividing wall 18 so that when the ports are in registry, steam is free to pass from the high pressure section to the low pressure section and the amount of steam passing to the bleeder connection is diminished. When so rotated that the ports 23 and 21 are not in registry or are only partially in registry the supply of motive fluid to the low pressure section 17 is diminished and the passage of steam to the bleeder connection is increased.

The admission valve 11 is controlled by a variable fluid pressure operated governor 24 and the interstage valve 12 is controlled by a variable fluid pressure operated governor 26. Fluid pressure varying with the speed of the turbine for operating the governors 24 and 26 is developed as by a centrifugal pump 27 which is driven directly by the turbine 10. The centrifugal pump 27 is supplied with fluid from a suitable reservoir 28 and, being driven directly by the turbine 10 develops a fluid pressure varying as the square of the speed thereof. Fluid under pressure developed by the pump 27 is delivered to the governor devices 24 and 26 through suitable conduits 29 and 31. Fluid exhausted from the governor devices 24 and 26 in operation drains back to the reservoir 28 through suitable conduits 32 and 33. Connected to the bleeder connection 13 is a conduit 34 leading to a pressure-responsive device 36 which I employ to vary back pressure upon the governor devices 24 and 26 and which will be more particularly pointed out later in this specification.

Referring now to Fig. 3 the governor device 24 embodies a housing 37 defining an operating cylinder 38 in which is disposed an operating piston 39. The operating piston 39 is made hollow, its hollow central portion defining a cylinder in which is located a piston pilot valve 41. The pilot valve 41 controls the movement of the operating piston 39. The operating piston 39 is provided with a lower stem portion 43 and an upper stem portion 44, said upper and lower portions sliding through and being approximately fluid-tight with respect to suitable heads 46 and 47 of the cylinder 38. The lower end of the housing 37 defines a supply chamber 48 to which fluid under pressure developed by the pump 27 is delivered by the conduit 29. The pilot valve 41 is closed at its upper end by a suitable cap member 49, said cap member 49 being provided with an orifice 51 which permits a restricted passage of fluid therethrough. The fluid pressure in the supply chamber 48 acts upwardly at all times on the lower stem portion 43 of the operating piston 39 and upon the pilot valve 41 and cap member 49. Fluid pressure acting against the pilot valve 41 is resisted by a spring 52, secured at its upper end to the cap member 49, and at its lower end to an adjusting screw 50 in the bottom of the housing 47.

The operating piston 39 is provided with a series of ports 53 leading from the interior thereof to its upper side and a series of ports 54 leading from the interior thereof to its lower side. The lower side of the operating piston 39 is connected at all times to the drain 33. The pilot valve 41 is provided with a series of ports 56 which are adapted at times to register with ports 53 of the operating piston 39 and admit fluid under pressure to the upper side of the operating piston. The upper side of the operating piston 39 is made of greater area than the lower stem portion 43 so that when fluid under pressure is admitted thereto it forces the piston downwardly against the fluid under pressure within the supply chamber 48. The pilot valve 41 is also provided with a reduced portion 57 which is adapted at times to place the upper and lower ports 53 and 54 of the operating piston 39 in communication so that fluid can pass from the upper side of the operating piston to the lower side thereof and thence to the exhaust through the drain 33, whereupon fluid under pressure within the supply chamber 48 acting against the lower stem portion 43 forces the operating piston 39 upwardly. Between the ports 56 and the reduced portion 57 is an annular shoulder 58 which, when in registry with the ports 53, prevents the passage of fluid to or from the upper side of the operating piston 39 whereupon it is held stationary by the fluid trapped thereabove and the fluid pressure acting against the lower stem portion 43 within the supply chamber 48.

The tension of the spring 52 is such that it holds the pilot valve 41 stationary with normal governing fluid pressure at the speed the turbine is desired to run and with normal back pressure, upon the valve 41. Upon increases in speed and consequent increases in governing fluid pressure, the pilot valve 41 is moved upwardly, placing the ports 53 and 54 in communication, allowing fluid from the upper side of the operating piston 39 to pass to the exhaust and permitting fluid under pressure within the supply chamber 48 to force the piston 39 upwardly until the ports are covered by the annular shoulder 58. Upon a decrease in speed and a consequent decrease in governing fluid pressure, the force of the spring 52 causes the pilot valve 41 to move downwardly and fluid under pressure is admitted through the ports 56 and ports 53 to the upper side of the operating piston 39 whereupon it is moved downwardly until the ports 53 are again covered. The upper stem portion 44 of the operating piston 39 is connected through a link 59, a lever 61, and a stem 62 to the admission valve 11 so that upon increases in speed, increases in governing fluid pressure and upward movements of the operating piston 39 the admission valve 11 is moved in a closing direction and upon decreases in speed and governing fluid pressure it is moved in an opening direction.

The action of the governor 24 is modified by a variable back pressure imposed upon the pilot valve 41. Fluid passing through the orifice 51 of the pilot valve 41 goes into a chamber 63 defined by the closed end of the upper portion of the stem 44 of the operating piston 39. The chamber 63 communicates with a conduit 64 through a passage 66 in the upper stem portion 44, said passage 66 in turn, communicating with an annular passage 67 provided in the upper end of the housing 37 into which the conduit 64 connects. The conduit 64 is connected to a housing 68. The housing 68 defines a chamber 69 having located therein a valve 71, said valve controlling the flow of fluid from the conduit 64. The chamber 69 has connected thereto a drain 72 so that fluid passing out of the conduit 64 by the valve 71 is free to pass through the drain 72 and back into the fluid reservoir 28. The valve 71 is biased downwardly by a spring 73, said spring 73 bearing, at its upper end, against a suitable abutment 74 carried by a lever 76. The lever 76 is connected to the pressure-responsive device 36 by a link 77 and is fulcrumed in a suitable member 78. The pressure-responsive device 36 embodies a diaphragm member 79 subjected on its lower side to pressure in the bleeder line through the conduit 34. The lever 76 is biased downwardly by a suitable weight 81 which tends to force the diaphragm member 79 downwardly.

Upon increases in bleeder pressure the diaphragm member 79 is forced upwardly against the force exerted by the weight 81, while upon decreases in bleeder pressure the diaphragm 79 is moved downwardly by the weight 81. In order to prevent abrupt movements of the diaphragm 79, and of the lever 76 a suitable dash pot 82 may be associated with lever 76. Upon increases in bleeder pressure the lever 76 is forced upwardly, as just described, decreasing the pressure exerted by the spring 73 upon the valve 71 thus permitting more fluid to pass through the conduit 64 and out through the drain 72. As the fluid flowing through the conduit 64 is increased, the back pressure upon the pilot valve 41 is decreased so that the governing fluid pressure within the supply chamber 48, having a decreased back pressure in opposition to it, forces the pilot valve upwardly followed by the operating piston 39 and a closing movement of the admission valve of the turbine 10.

Upon a decrease in bleeder pressure below that required or desired the weight 81 pulls the lever 76 downwardly increasing the force of the spring 73 upon the valve 71 and decreasing the amount of fluid flowing through the conduit 64, thus increasing the back pressure upon the pilot valve 41. Upon an increase in back pressure upon the pilot valve 41 the spring 52 pulls the pilot valve 41 downwardly followed by the operating piston 39 and moves the admission valve 11 in an opening direction, increasing the supply of steam to the turbine to meet the increased bleeder demand.

The governing device 26 which is employed to control the interstage valve at 12 embodies a valve chest 83 and an operating cylinder 84. The operating cylinder 84 has located therein a piston 86 connected through a link 87 with the interstage valve at 12. The interstage valve at 12 is so arranged that upon upward movements of the piston 86, rotating the grid member 22 to the left as shown in Fig. 3, the ports 21 and 23 are placed more in registry, thus accomplishing an opening movement of the grid valve. Upon downward movement of the piston 86, rotating the grid member 22 to the right as shown in Fig. 3, the ports 21 and 23 are moved out of registry, thus accomplishing a closing movement of the interstage valve at 12. The piston 86 is controlled by a piston valve 88 located within the valve chest 83 and subjected on its under side to the variable fluid pressure developed by the pump 27 through the conduit 31. The valve 88 is made hollow and has connected thereto a spring 89 secured at its upper end to the upper end of the valve 88 and at its lower end to an anchor 91 carried by a stem 92 which is, in turn, connected to a lever 93. The lever 93 is connected at one end to the stem 87 and at its opposite end to a stationary member 94.

The valve 88 is provided with a series of ports 96 adapted, upon upward movement of the valve, to admit fluid under pressure to the upper side of the piston 86 and upon downward movement of the valve to admit fluid under pressure to the under side of the piston 86 causing it to move upwardly. The valve 88 is also provided with an upper reduced portion 97 and a lower reduced portion 98. Upon downward movement of the valve 88 the upper reduced portion 97 places the upper side of the piston 86 in communication with an exhaust port 99. Upon upward movement of the valve 88 the lower reduced portion 98 places the under side of the piston 86 in communication with an exhaust port 101, the exhaust ports 99 and 101 being connected to the drain conduit 32. Between the upper reduced portion 97 and the series of ports 96 is an annular shoulder 103 and between the lower reduced portion 98 and the series of ports 96 is an annular shoulder 104, said annular shoulders being adapted, when the valve is in neutral position, to cover the ports 106 and 107 communicating with the upper and lower sides, respectively, of the operating piston 86. The upper end of the valve 88 is provided with an orifice 108 similar to the orifice 51 of the pilot valve 41 and having a similar function, that is, it permits a restricted flow of fluid to pass from the under side of the valve 88 to the upper side thereof.

In operation, upon increases in speed of the turbine and consequent increases in governing fluid pressure, the valve 88 is moved upwardly against the tension of the spring 89, placing the ports 96 in communication with port 106 leading to the upper side of the operating piston 86. At the same time, port 107 communicating with the under side of the piston 86 is placed in communication with the exhaust port 101 by way of the reduced portion 98 of the valve 88. The piston 86 is now forced downwardly, imparting a closing movement to the interstage valve 12 and diminishing the supply of steam to the reaction or low pressure stages 17 of the turbine 10 and at the same time increasing the supply of steam passing out through the bleeder connection 13. As previously explained, however, the governor 24 is acting at the same time to decrease the amount of steam admitted through the admission valve 11 to the high pressure section 16 so that in the case assumed, the throttling of the interstage valve 12 simultaneously with the throttling of the admission valve 11 serves to decrease the speed of the turbine without decreasing the bleeder line pressure.

As the piston 86 moves downwardly it carries with it the lever 93, which being connected to the stem 92, pulls the spring 89 downwardly and brings the valve 88 back to its neutral position with the ports 106 and 107 covered.

The upper side of the valve 88 communicates through a conduit 111 with the housing 68 and the chamber 69. The flow of fluid through the conduit 111 is controlled by a valve 112 which is biased downwardly by a spring 113. The spring 113 bears at its upper end against an abutment 114 carried by the lever 76. The abutment 114 is connected to the lever 76 on the opposite side of the fulcrum member 78 from the connection with the abutment 74 of the spring 73. It will be apparent therefore that back pressure acting against the valve 88 is varied by the changes in pressure in the bleeder connection 13 but is varied reversely to the back pressure acting against the pilot valve 41. Upon an increase in pressure within the bleeder connection 13, causing an upward movement of the diaphragm 79 and an upward movement of the left hand end of the lever 76, the spring pressure upon the valve 71 is decreased while the spring pressure upon the valve 112 is increased. This results in an increased flow of fluid through the conduit 64 and a decreased flow of fluid through the conduit 111. As the flow of fluid through the conduit 111 is decreased, pressure is built up on the upper side of the valve 88 and the spring 89 pulls the valve 88 downwardly. Upon a downward movement of the valve 88 the piston 86 moves upwardly, effecting an opening movement of the interstage valve at 12, increasing the steam passing from the high pressure section 16 to the low pressure sections 17, and thus decreasing the amount of steam passing out through the bleeder connection 13. At the same time, the back pressure acting against the pilot valve 41 being decreased, the pressure beneath it forces it upwardly, followed by the operating piston 39, thus effecting a closing movement of the admission valve 11 and decreasing the supply of steam to the turbine 10.

It may thus be seen that upon a decreased bleeder demand and a consequent increase in bleeder pressure, the passage of steam from the high pressure to the low pressure section of the turbine 10 is increased and at the same time the supply of high pressure steam to the turbine is decreased, thus decreasing the passage of steam to the bleeder connection 13. On the other hand, should there be an increase in bleeder demand and a decrease in pressure in the bleeder connection 13, the diaphragm 79 moves the lever 76 downwardly, causing an increase in back pressure acting against the pilot valve 41 and a decrease in back pressure acting against the valve 88. Upon an increase in back pressure acting against the pilot valve 41 the spring 52 causes it to move downwardly, followed by the operating piston 39 and effecting an opening movement of the admission valve 11, admitting more steam to the turbine 10. At the same time, the back pressure acting against the valve 88, being decreased, pressure beneath the valve forces it upwardly, effecting a downward movement of the piston 86 and a closing movement of the interstage valve 12, thus decreasing the flow of steam from the high pressure to the low pressure section of the turbine 10 and increasing the flow of steam through the bleeder connection 13. It will be apparent therefore that upon a decrease in bleeder line pressure below that normally required, the supply of steam to the turbine 10 is increased and the passage of steam to the low pressure sections of the turbine is decreased, effecting an increased supply of steam to the bleeder connection.

The speed of the turbine may be varied by increasing the tension of the springs 73 and 113. To this end I show the fulcrum member 78 as being located intermediate the springs 73 and 113 and carried by a lever 116 which is, in turn, fulcrumed on a stationary member 117. The lever 116 is connected at its opposite end to a stem 118, said stem being provided with threads 119 and screwed through a suitable gear member 121. The gear member 121 may be rotated in either direction by a motor 122, thus effecting a change in spring pressure upon the valves 71 and 112.

Should it be desired to modify the action of the governing device 24 independently of the governing device 26, the screw connection 50 for the governor 24 is adapted to vary the initial tension of the spring 52. Similarly a screw connection 124 is provided for the governor 26 and is adapted to vary the initial tension of the spring 89.

It may also be desired to change the relative movement of the piston 86 and its controlling valve 88. To this end I show the stem 92 which is connected to the spring 89 as being connected to the lever 93 with a sliding connection 126. By moving the sliding connection 126 nearer to the fulcrum 94 the piston 86 is given a longer movement per unit of movement of the valve 88 in order to bring it to lap or neutral position. By moving the sliding connection 126 nearer to the stem 87, the piston 86 is given a shorter relative movement per unit of movement of the valve 88 in order to bring the valve back to lap or neutral position. The ratio of movement of the piston 86 to the valve 88, and consequently the movement of the piston 86 per unit of change in governing pressure or unit of change in speed of the turbine, may thus be varied.

Referring now to Fig. 4 I show in diagrammatic form a power plant employing a plurality of turbines, one of which is a bleeder turbine and equipped with regulating apparatus made in accordance with my invention. In the drawing numerals 128, 129 and 131 designate turbines driving generators 132, 133 and 134 respectively, said generators feeding into a common bus line 136. High pressure steam for driving the turbines 128, 129 and 131 is supplied from a main steam line 137. The three turbines exhaust into a common exhaust line 138 having a branch line 139 leading into a condenser 141. At 142 and 143 are indicated power plant auxiliary machines such, for example, as pumps, driven by the turbines 144 and 146 respectively. Steam for driving the turbines 144 and 146 is conveyed thereto through a branch line 147 leading off from the main steam line 137. The turbines 144 and 146 exhaust into a common exhaust line 148. The exhaust line 148 is connected through a branch 149 to the condenser 141 or the exhaust may be diverted by a conduit 151 for purposes to be more fully explained later.

The turbine 128 is of the bleeder or extraction type such as is illustrated in Fig. 1, the bleeder connection being indicated at 152. Each of the turbines 128, 129 and 131 is equipped with a variable fluid pressure operated governor 24 as illustrated in Fig. 3, and the turbine 128 is equipped with a variable fluid pressure operated governor 26 for its interstage valve. In the illustration shown, the turbine 128 may be employed either as a bleeder turbine or as a mixed pressure turbine. When running as a bleeder turbine, steam from the bleeder connection 152 is conveyed into a conduit 153 through which it may be conveyed to any desired point and employed for any desired purpose. When so running a valve 154, provided in the conduit 151, is closed and a valve 156 provided in the conduit 149 is opened so that the auxiliary turbines 144 and 146 exhaust directly into the condenser 141. Should it be desired to employ the turbine 128 as a mixed pressure turbine, a valve 157 provided in the conduit 153 is closed, the valve 154 is opened and the valve 156 is closed so that the exhaust from the auxiliary turbines 144 and 146 passes into the turbine 128 through the bleeder connection 152 and thence through the low pressure stages of the turbine 128 as shown at 17 in Fig. 2.

Assume that the turbine 128, working in parallel with the turbines 129 and 131, is being employed as a mixed pressure turbine. It will be apparent that it is more economical to extract all of the available energy from the steam exhausted from the turbines 144 and 146 and that the supply of steam from said turbines should not be throttled. Under the conditions assumed, with steam passing into the turbine 128 at the bleeder connection 152, pressure builds up at the bleeder connection and, referring again to Fig. 3, causes a building up of back pressure against the valve 88 of the governor 26. As the back pressure builds up above the valve 88, the spring 89 pulls it downwardly, causing an upward movement of the piston 86 and effecting an opening movement of the interstage valve 12. Steam from the auxiliary turbines 144 and 146 is thus given a freer passage through the turbine 128 and the turbine 128 tends to take over more than its share of the load with respect to the turbines 129 and 131.

At the same time, the back pressure on the pilot valve 41 of the governor 24 has been decreased causing an upward movement thereof and effecting a closing movement of the admission valve 11. It may thus be seen that whenever sufficient exhaust steam is available from the auxiliary turbines 144 and 146, the high pressure steam is throttled and more economical operation of the power plant is attained.

From the foregoing detailed description, the operation of apparatus made in accordance with my invention will be apparent. With the turbine 10, shown in Fig. 1, operating as a bleeder turbine, assume first that there is an increase in load on the turbine without any change in bleeder demand. Upon an increase in load, the speed of the turbine decreases and the governing fluid pressure decreases. Upon a decrease in governing fluid pressure, both the pilot valve 41 of the governor 24 and the valve 88 of the governor 26 move downwardly responsive to the change in governing fluid pressure. Downward movement of the pilot valve 41 effects an opening movement of the admission valve 11, admitting more steam to the turbine. Were no provision made for immediately taking care of this additional increment of steam, the pressure within the bleeder line 13 would rise. The valve 88, however, and its downward movement simultaneously with the downward movement of the pilot valve 41 effects an opening movement of the interstage valve 12, thus permitting freer passage of steam through the low pressure stages 17, increasing the power developed by the turbine without increasing the pressure at the bleeder connection. Upon a decrease in load, without a change in bleeder demand, the speed of the turbine increases, causing an increase in the governing fluid pressure. Upon an increase in governing fluid pressure, the pilot valve 41 of the governor 24 and the valve 88 of the governor 26 are moved upwardly responsive to the change in governing fluid pressure. Upon upward movement of the pilot valve 41, a closing movement of the admission valve 11 is effected, thus diminishing the supply of high pressure steam to the turbine 10. Were no provision made for throttling the passage of steam from the high pressure section to the low pressure section of the turbine, the pressure within the bleeder connection 13 would drop. The valve 88, however, moving upwardly simultaneously with the valve 41, effects a downward movement of the piston 86 and a closing movement of the interstage valve 12, thus throttling the passage of steam from the high pressure section 16 to the low pressure sections 17, reducing the speed of the turbine 10 and diverting more steam to the bleeder connection 13 so that there is no change in pressure within said bleeder connection.

Assume now that there is a constant load with a variable bleeder demand and that there is a drop in pressure within the bleeder connection 13. The pressure responsive device 36 moves the lever 76 downwardly, effecting an increase in back pressure upon the pilot valve 41 and a decrease in the back pressure upon the valve 88. Upon a decrease in back pressure upon the valve 88 it moves upwardly, effecting a closing movement of the interstage valve 12, thus diverting more steam to the bleeder connection 13. At the same time, the back pressure upon the pilot valve 41 being increased, it moves downwardly, effecting an opening movement of the admission valve 11 and thus admitting more steam to the turbine and preventing a fluctuation in the power developed thereby. Upon an increase in the pressure within the bleeder connection 13, the pressure responsive device 36 causes the lever 76 to move upwardly, effecting an increase in the back pressure upon the valve 88 and a decrease in the back pressure upon the pilot valve 41. Upon a decrease in the back pressure upon the pilot valve 41, the pressure beneath it forces it upwardly, effecting a closing movement of the admission valve 11 and reducing the supply of steam to the turbine. At the same time the increase in back pressure upon the valve 88 permits the spring 89 to pull it downwardly, effecting an opening movement of the interstage valve 12, permitting more steam to pass from the high pressure to the low pressure section of the turbine and bringing the pressure within the bleeder connection back to that desired.

Should it be desired to change the operating speed of the turbine, the motor 122 is caused to rotate the gear member 121, thus changing the vertical position of the fulcrum member 78, which is located equi-distantly between the valve 71 and 112, thus changing the initial compression of the springs 113 and 73.

From the foregoing it will be apparent that I have invented a regulating apparatus for bleeder turbines which is simple of design, easy of manufacture, and which is capable of effecting extremely close regulation of the turbine under widely varying loads and bleeder demands.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, a fluid pressure operated governor for the admission valve, a spring loaded controlling element subjected to the variable fluid pressure included in the governor, means for imposing a back fluid pressure on the controlling element, and means responsive to an operating condition of the turbine which varies in consequence of variations in flow through the bleeder connection for varying the back pressure imposed on said element.

2. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, a fluid pressure operated governor for the inter-stage valve, a spring loaded controlling element subjected to the variable fluid pressure included in the governor, means for imposing a back fluid pressure on the controlling element, and means responsive to pressure in the bleeder connection for varying the back pressure imposed on said element.

3. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, separate fluid pressure operated governing means for the admission valve and for the inter-stage valve, a spring loaded controlling element subjected to the variable fluid pressure included in each of the governing means, means for imposing a back fluid pressure on each of the controlling elements, and means responsive to pressure in the bleeder connection for varying the back pressure imposed on both of said elements.

4. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, a fluid pressure operated governor for the admission valve, a spring loaded controlling element subjected to the variable fluid pressure included in the governor, means for imposing a back fluid pressure on the controlling element, and pressure responsive means communicating with the bleeder connection for decreasing the back pressure imposed upon said element upon increases in bleeder pressure and for increasing the back pressure upon said element upon decreases in bleeder pressure.

5. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, a fluid pressure operated governor for the inter-stage valve, a spring loaded controlling element subjected to the variable fluid pressure included in the governor, means for imposing a back fluid pressure on the controlling element, and pressure responsive means communicating with the bleeder connection for increasing and decreasing the back pressure imposed upon said element upon increases and decreases, respectively in bleeder pressure.

6. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, separate fluid pressure operated governing means for the admission valve and for the inter-stage valve, a spring loaded controlling element subjected to the variable fluid pressure included in each of the governing means, a spring loaded relief valve associated with each of the governing means for imposing a back fluid pressure on the controlling elements, a lever for controlling the spring load on both of the relief valves, and a diaphragm communicating with the bleeder connection for operating the lever.

7. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, separate fluid pressure operated governing means for the admission valve and for the inter-stage valve, a spring loaded controlling element subjected to the variable fluid pressure included in each of the governing means, a spring loaded relief valve associated with each of the governing means for imposing a back fluid pressure on each of the controlling elements, a lever for controlling the spring load on both of the relief valves, said lever being fulcrumed at a point intermediate the relief valves, and a diaphragm communicating with the bleeder connection for operating the lever.

8. The combination with a bleeder turbine having a high pressure section, a low pressure section and a bleeder connection between the sections, of an admission valve for controlling the high pressure section and an inter-stage valve for controlling the low pressure section, means for developing fluid pressure varying with the speed of the turbine, separate fluid pressure operated governing means for the admission valve and for the inter-stage valve, a spring loaded controlling element subjected to the variable fluid pressure included in each of the governing means, a spring loaded relief valve associated with each of the governing means for imposing a back fluid pressure on each of the controlling elements, a lever for controlling the spring load on both of the relief valves, said lever being fulcrumed at a point intermediate the relief valves, a weighted diaphragm communicating with the bleeder connection for operating the lever, said weighted diaphragm being so positioned as to decrease the spring load on the relief valve associated with the governing means for the admission valve upon increases in bleeder pressure and increase the spring load upon the relief valve associated with the governing means for the inter-stage valve upon increases in bleeder pressure and to increase the spring load on the relief valve associated with the governing means for the admission valve upon decreases in bleeder pressure and decrease the spring load upon the relief valve associated with the governing means for the inter-stage valve upon decreases in bleeder pressure.

9. In a turbine having a high pressure section and a low pressure section, the combination of an admission valve for controlling the admission of motive fluid to the turbine, an inter-stage valve for controlling the flow of motive fluid from the high pressure section to the low pressure section, means communicating with the interior of the turbine between the high pressure section and the inter-stage valve, means providing a fluid pressure varying with the speed of the turbine, means responsive to said fluid pressure for controlling both the admission valve and the inter-stage valve, and means responsive to pressure within the communicating means for modifying the action of the pressure responsive means.

10. In a bleeder turbine having a high pressure section, a low pressure section and a bleeder connection between the sections, the combination of an admission valve for controlling the admission of motive fluid to the turbine, an inter-stage valve for controlling the flow of motive fluid from the high pressure section to the low pressure section and into the bleeder connection, a governor responsive to the speed of the turbine for effecting a closing movement of the admission valve upon increases in speed and an opening movement of the admission valve upon decreases in speed, and a second governor responsive to the speed of the turbine for effecting like closing and opening movements of the inter-stage valve upon increases and decreases in speed.

11. The combination defined in claim 10, and a pressure responsive device associated with the bleeder connection for modifying the action of the admission valve governor.

12. The combination defined in claim 10, and a pressure responsive device associated with the bleeder connection for modifying the action of the interstage valve governor.

13. In a bleeder turbine having a high pressure section, a low pressure section and a bleeder connection between the sections, the combination of an admission valve for controlling the admission of motive fluid to the turbine, an inter-stage valve for controlling the flow of motive fluid from the high pressure section to the low pressure section and into the bleeder connection, a governor responsive to the speed of the turbine for effecting a closing movement of the admission valve upon increases in speed and an opening movement of the admission valve upon decreases in speed, a second governor responsive to the speed of the turbine for effecting like closing and opening movements of the inter-stage valve upon increases and decreases in speed, and a pressure responsive device associated with the bleeder connection for modifying the action of both of the governors.

14. In a bleeder turbine having a high pressure section, a low pressure section and a bleeder connection between the sections, the combination of an admission valve for controlling the admission of motive fluid to the turbine, an inter-stage valve for controlling the flow of motive fluid from the high pressure section to the low pressure section and into the bleeder connection, a governor responsive to the speed of the turbine for effecting a closing movement of the admission valve upon increases in speed and an opening movement of the admission valve upon decreases in speed, a second governor responsive to the speed of the turbine for effecting like closing and opening movements of the inter-stage valve upon increases and decreases in speed, a pressure responsive device associated with the bleeder connection, an operative connection between the pressure responsive device and both of the speed responsive governors whereby upon increases in bleeder connection pressure a closing movement of the admission valve and an opening movement of the inter-stage valve is effected and upon decreases in bleeder connection pressure an opening movement of the admission valve and a closing movement of the inter-stage valve is effected.

15. In a bleeder turbine having a high pressure section, a low pressure section and a bleeder connection between the sections, the combination of an admission valve for controlling the admission of motive fluid to the turbine, an interstate, valve for controlling the flow of fluid from the high pressure section to the low pressure section and into the bleeder connection, means for developing fluid pressure varying with the speed of the turbine, a governor operated by the variable fluid pressure and including a spring weighted controlling element subjected to the variable fluid pressure for controlling the admission valve, a second governor operated by the variable fluid pressure and including a spring weighted controlling element subjected to the variable fluid pressure for controlling the inter-stage valve, means permitting a restricted flow of fluid by both of said spring loaded controlling elements, valves biased to closed position for imposing a back pressure upon the fluid flowing by the spring loaded controlling elements, a pressure responsive device associated with the bleeder connection, and an operative connection between the pressure responsive device and the biased valves for varying the back pressure on the spring loaded controlling elements.

16. In a bleeder turbine having a high pressure section, a low pressure section and a bleeder connection between the sections, the combination of an admission valve for controlling the admission of motive fluid to the turbine, an inter-stage valve for controlling the flow of fluid from the high pressure section to the low pressure section and into the bleeder connection, means for developing fluid pressure varying with the speed of the turbine, a governor operated by the variable fluid pressure and including a spring weighted controlling element subjected to the variable fluid pressure for controlling the admission valve, a second governor operated by the variable fluid pressure and including a spring weighted controlling element subjected to the variable fluid pressure for controlling the inter-stage valve, means permitting a restricted flow of fluid by both of the spring loaded controlling elements, valves biased to closed position for imposing a back pressure upon the fluid flowing by the spring loaded controlling elements, a pressure responsive device associated with the bleeder connection, an operative connection between the pressure responsive device and the biased valves for varying the back pressure on the spring loaded controlling elements, and means for varying the initial pressure on the biased valves.

17. In a bleeder turbine having a high pressure section, a low pressure section and a bleeder connection between the sections, the combination of an admission valve for controlling the admission of motive fluid to the turbine, an inter-stage valve for controlling the flow of fluid from the high pressure section to the low pressure section and into the bleeder connection, means for developing fluid pressure varying with the speed of the turbine, a governor operated by the variable fluid pressure and including a spring weighted controlling element subjected to the variable fluid pressure for controlling the admission valve, a second governor operated by the variable fluid pressure and including a spring weighted controlling element subjected to the variable fluid pressure for controlling the inter-stage valve, means permitting a restricted flow of fluid by both of the spring loaded controlling elements, valves biased to a closed position for imposing a back pressure upon the fluid flowing by the spring loaded controlling elements, a pressure responsive device associated with the bleeder connection, an operative connection between the pressure responsive device and the biased valves for varying the back pressure on the spring loaded controlling elements, and motor actuated means for simultaneously varying the initial pressure on the biased valves.

18. In a turbine, a high pressure section, a low pressure section, a connection for admitting or bleeding motive fluid between the sections, an admission valve for the high pressure section, an inter-stage valve for controlling the flow of fluid into the low pressure section, means for developing fluid pressure varying as the speed of the turbine, separate variable fluid pressure operated governors for the admission valve and for the inter-stage valve, each of said governors including a spring loaded controlling element subjected to the variable fluid pressure and adapted to permit a restricted flow of fluid thereby, valves biased to a closed position for imposing a back pressure upon the fluid flowing by the spring loaded controlling elements, a pressure responsive device communicating with the connection for admitting or bleeding motive fluid between the sections, and an operative connection between the pressure responsive device and the biased valves, whereby upon variations in pressure at the connection for admitting or bleeding motive fluid between the sections the back pressure upon the governor controlling elements is varied effecting an increased opening of the inter-stage valve and a decreased opening of the admission valve upon increases in pressure and a decreased opening of the interstage valve and an increased opening of the admission valve upon decreases in pressure.

19. The combination with a bleeder turbine having a high pressure section, a low pressure section and a bleeder connection between the sections, of an admission valve for controlling the high pressure section, an inter-stage valve for controlling the low pressure section, separate speed responsive governors for each of said valves, and means for varying the effective movement of the governor controlling the inter-stage valve per unit of change in turbine speed.

20. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, separate fluid pressure operated governors for the admission valve and for the inter-stage valve, and means for varying the effective movement of the governor controlling the inter-stage valve per unit of change in governing fluid pressure.

21. The combination with a bleeder turbine having a high pressure section, a low pressure section and a bleeder connection between the sections, of an admission valve for controlling the high pressure section, an inter-stage valve for controlling the low pressure section, means for developing fluid pressure varying with the speed of the turbine, separate fluid pressure operated governors for the admission valve and for the inter-stage valve, means for varying the effective movement of the governor controlling the inter-stage valve per unit of change in governing fluid pressure, means for simultaneously varying the setting of both of the governors, and independent means for varying the setting of each of the governors.

22. In a governing mechanism for a machine, the combination of pressure-responsive means, means providing an enclosed space, means providing a restricted flow of fluid into said space, or pressure relief valve responsive to an operating condition of said machine for controlling the escape of fluid from said enclosed space, and means for applying the pressure in said enclosed space to the pressure-responsive means.

23. The combination with an elastic fluid prime mover having a valve means controlling the admission of elastic fluid thereto and a second valve means controlling the flow of fluid at an intermediate point therein, of fluid-actuated motors each having a pilot valve for moving said valve means, two control means each responsive to the pressure of the fluid at said intermediate point, hydraulic means for moving one pilot valve in response to one control means, and hydraulic means for moving the other pilot valve in response to the other control means.

24. The combination defined in claim 23, and means whereby the pilot valve of the motor for the admission valve means is further controlled in response to the speed of the prime mover.

25. The combination defined in claim 23, and means whereby the pilot valves of both motors are controlled also in response to the speed of the prime mover.

26. In a control mechanism for a prime mover having an admission valve and a second valve controlling the flow of motive fluid at an intermediate point of the prime mover, the combination of an operating device responsive to an operating condition of the prime mover, two control devices simultaneously operated by the operating device, a fluid pressure relay controlled by a fluid-pressure-actuated member for operating the admission valve, hydraulic means connecting the fluid-pressure-actuated member with one control device whereby the device controls said member, a fluid pressure relay controlled by a fluid-pressure-actuated member for operating the second valve, and hydraulic means connecting the last-mentioned fluid-pressure-actuated member with the other control device whereby the latter controls the member.

27. In a control mechanism for a prime mover having an admission valve and a second valve controlling the flow of motive fluid at an intermediate point of the prime mover, the combination of an operating device responsive to the pressure of motive fluid within the prime mover in a region adjacent said intermediate point, two control devices simultaneously operated by the operating device, a fluid pressure relay controlled by a fluid-pressure-actuated member for operating the admission valve, hydraulic means connecting the fluid-pressure-actuated member with one control device whereby the device controls said member, a fluid pressure relay controlled by a fluid-pressure-actuated member for operating the second valve, and hydraulic means connecting the last-mentioned fluid-pressure-actuated member with the other control device whereby the latter controls the member.

28. In a control mechanism for a prime mover having an admission valve and a second valve controlling the flow of motive fluid at an intermediate point of the prime mover, the combination of a unitary structure including an operating device responsive to an operating condition of the prime mover and two control devices actuated by the operating device, means controlled by a fluid-pressure-actuated member for operating the admission valve, means providing an enclosed space communicating between the fluid-pressure-actuated member and one control device, said one control device controlling said fluid-pressure-actuated member solely by controlling the application of fluid pressure thereto through said enclosed space, means controlled by a second fluid-pressure-actuated member for operating the second valve, and means providing a second enclosed space communicating between the second fluid-pressure-actuated member and the other control device, said other control device controlling said second fluid-pressure-actuated member solely by controlling the application of fluid pressure thereto through the second enclosed space.

29. In a control mechanism for a prime mover having an admission valve and a second valve controlling the flow of motive fluid at an intermediate point of the prime mover, the combination of a unitary structure including an operating device responsive to an operating condition of the prime mover and two control devices actuated by the operating device, means controlled by a fluid-pressure-actuated member for operating the admission valve, means providing an enclosed space communicating between the fluid-pressure-actuated member and one control device, said one control device controlling said fluid-pressure-actuated member solely by controlling the application of fluid pressure thereto through said enclosed space, means controlled by a second fluid-pressure-actuated member for operating the second valve, means providing a second enclosed space communicating between the second fluid-pressure-actuated member and the other control device, said other control device controlling said second fluid-pressure-actuated member solely by controlling the application of fluid pressure thereto through the second enclosed space, and means whereby said fluid-pressure-actuated members are actuated by fluid pressure in response to changes in speed of the prime mover.

30. In a fluid pressure governing mechanism for a prime mover, the combination of an impeller for developing fluid pressure varying as a function of the speed of the prime mover, means providing an enclosed space, means providing a restricted flow into the enclosed space of fluid discharged by the impeller, means controlling the escape of fluid from said space and imposing on the fluid therein a pressure varying in accordance with a condition of the motive fluid flowing through the prime mover, and means responsive to the fluid pressure developed by the impeller and to the pressure of the fluid in said enclosed space for controlling the admission of motive fluid to the prime mover.

31. In a fluid pressure governing mechanism for a prime mover, the combination of means providing a fluid pressure varying with the speed of the prime mover, means providing an enclosed space, means providing a restricted flow of fluid into said space, a pressure relief valve controlling the escape of fluid from said space and imposing a variable pressure on the fluid therein, means responsive to a condition of the motive fluid flowing through the prime mover for regulating the pressure relief valve to vary the pressure imposed on the fluid in said space, and means responsive to the fluid pressure developed by the first-mentioned means and to the pressure of the fluid in said enclosed space for controlling the admission of motive fluid to the prime mover.

32. In a fluid pressure governing mechanism for a prime mover, the combination of means for developing fluid pressure varying as a function of the speed of the prime mover, means providing an enclosed space, means providing a restricted flow of fluid from said means into the enclosed space, a pressure-relief valve controlling the escape of fluid from said space and imposing a variable pressure on the fluid therein, means responsive to a condition of the motive fluid flowing through the prime mover for regulating the pressure-relief valve to vary the pressure imposed on the fluid in said space, and means responsive to the fluid pressure developed by the first-mentioned means and to the pressure of the fluid in said enclosed space for controlling the admission of motive fluid to the prime mover.

In testimony whereof, I have hereunto subscribed my name this first day of April, 1925.

OZRO N. BRYANT.

CERTIFICATE OF CORRECTION.

Patent No. 1,778,004.   Granted October 7, 1930, to

OZRO N. BRYANT.

It is hereby certified that error appears in the printed specification of the above numbered patent requiring correction as follows: Page 9, line 11, claim 15, for "interstate" read interstage, and page 10, line 49, claim 22, for "or" read a; and that the said Letters Patent should be read with these corrections therein that the same may conform to the record of the case in the Patent Office.

Signed and sealed this 6th day of January, A. D. 1931.

(Seal)

M. J. Moore,
Acting Commissioner of Patents.